US011636766B2

(12) United States Patent
Staahl (10) Patent No.: US 11,636,766 B2
(45) Date of Patent: Apr. 25, 2023

(54) REVERSING-ASSISTANCE SYSTEM AND A METHOD FOR ASSISTING REVERSING

(71) Applicant: KNORR-BREMSE SYSTEME FUER NUTZFAHRZEUGE GMBH, Munich (DE)

(72) Inventor: Christian Staahl, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 37 days.

(21) Appl. No.: 16/646,132

(22) PCT Filed: Sep. 12, 2018

(86) PCT No.: PCT/EP2018/074596
§ 371 (c)(1),
(2) Date: Mar. 10, 2020

(87) PCT Pub. No.: WO2019/053057
PCT Pub. Date: Mar. 21, 2019

(65) Prior Publication Data
US 2020/0273344 A1   Aug. 27, 2020

(30) Foreign Application Priority Data
Sep. 14, 2017   (DE) .................... 10 2017 121 302.3

(51) Int. Cl.
*G08G 1/16* (2006.01)
*H04W 4/38* (2018.01)
(Continued)

(52) U.S. Cl.
CPC ........... *G08G 1/168* (2013.01); *B60R 16/023* (2013.01); *B60R 16/0207* (2013.01);
(Continued)

(58) Field of Classification Search
CPC .......... G08G 1/168; H04W 4/38; H04W 4/40; B60R 16/0207; B60R 16/023;
(Continued)

(56) References Cited

U.S. PATENT DOCUMENTS 7,046,127 B2    5/2006  Boddy
2003/0212480 A1*  11/2003  Lutter ................... B60R 21/013
                                                  701/31.4
(Continued)

FOREIGN PATENT DOCUMENTS

CN    108068800 B  *  9/2020
DE    102010044031 A1    5/2012
(Continued)

OTHER PUBLICATIONS

International Search Report dated Dec. 7, 2018, of the corresponding International Application PCT/EP2018/074596.

*Primary Examiner* — Hunter B Lonsberry
*Assistant Examiner* — Jay Khandpur
(74) *Attorney, Agent, or Firm* — Norton Rose Fulbright US LLP; Gerard Messina (57) ABSTRACT

A reversing-assistance system for a vehicle, in particular for a utility vehicle, that exhibits a vehicle wiring harness, including: at least one sensor with a first wireless interface, to register a rear region of the vehicle and to transmit corresponding sensor signals in wireless manner; and a control unit, which is connected to the vehicle wiring harness and which includes a second wireless interface, to receive the sensor signals from the at least one sensor in wireless manner, to evaluate the sensor signals and to make them available; in which the control unit is configured to evaluate vehicle-related data independently of the sensor signals and, based on the data, to carry out a control of at least one component of the vehicle so as to perform a control function that is independent of the reversing assistant. Also (Continued)

described are a related method, a computer readable medium, and a utility vehicle.

8 Claims, 4 Drawing Sheets

(51) Int. Cl.
  *H04W 4/40* (2018.01)
  *B60R 16/02* (2006.01)
  *B60R 16/023* (2006.01)
  *B60W 30/09* (2012.01)
  *B60W 30/18* (2012.01)
  *B60W 50/14* (2020.01)

(52) U.S. Cl.
  CPC ...... *B60W 30/09* (2013.01); *B60W 30/18036* (2013.01); *B60W 30/18109* (2013.01); *B60W 50/14* (2013.01); *H04W 4/38* (2018.02); *H04W 4/40* (2018.02); *B60W 2420/52* (2013.01); *B60W 2420/54* (2013.01); *B60W 2556/45* (2020.02)

(58) Field of Classification Search
  CPC ........... B60W 30/09; B60W 30/18036; B60W 30/18109; B60W 50/14; B60W 2556/45; B60W 2420/52; B60W 2420/54
  See application file for complete search history.

(56) References Cited

U.S. PATENT DOCUMENTS

| | | | | |
|---|---|---|---|---|
| 2009/0040300 | A1* | 2/2009 | Scribner | H04N 5/23293 348/143 |
| 2014/0022389 | A1* | 1/2014 | Kageta | H04N 7/183 348/148 |
| 2015/0350750 | A1* | 12/2015 | Yun | H04Q 9/00 340/870.07 |
| 2016/0323484 | A1* | 11/2016 | Moenig | H04N 5/2257 |
| 2017/0331936 | A1* | 11/2017 | Juzswik | H04B 1/3877 |

FOREIGN PATENT DOCUMENTS

| | | | |
|---|---|---|---|
| DE | 112012004782 T5 | 8/2014 | |
| DE | 102015109537 A1 | 12/2015 | |
| WO | WO-02084616 A1 * | 10/2002 | ............ B60R 1/00 |
| WO | 2006/000580 A2 | 1/2006 | |
| WO | 2013/074901 A2 | 5/2013 | |

* cited by examiner

REVERSING-ASSISTANCE SYSTEM AND A METHOD FOR ASSISTING REVERSING

FIELD OF THE INVENTION

The present invention relates to a reversing-assistance system and a method for assisting reversing and, in particular, to a wireless reversing-assistance system and a ramp-approach aid.

BACKGROUND INFORMATION

Reversing maneuvers with a truck and, in particular, of a truck with a trailer are frequently associated with difficulties that can only be overcome with a lot of practice. Even experienced drivers do not always manage a maneuver at the first attempt, so several attempts are often necessary, making reversing time-consuming. In this connection, not only the poor overview in the restricted field of view at the rear of the vehicle represents a problem. Assessing a distance from an obstacle behind the vehicle or from a roof overhang is also frequently problematic.

There are believed to be ramp-approach aids that are installed on the trailer as part of assistance systems and are based primarily on ultrasonic sensors which monitor the rear space more or less constantly.

Figure 4:
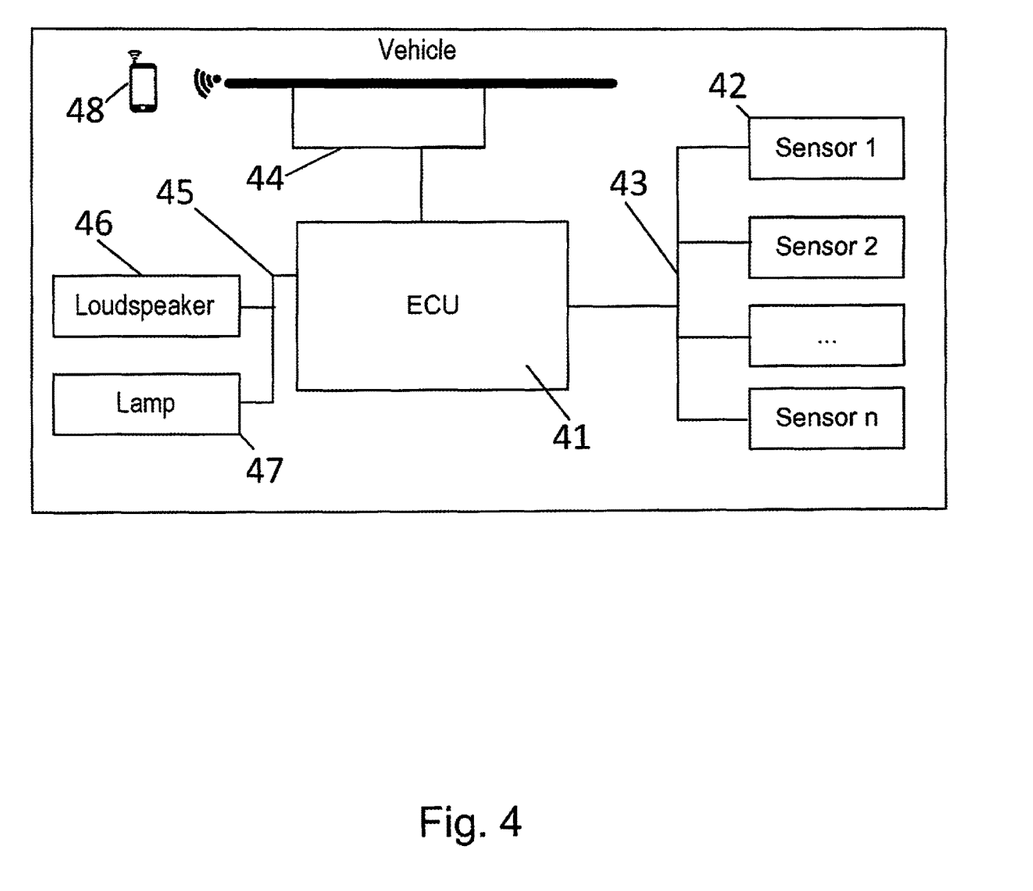
FIG. 4 illustrates a conventional reversing-assistance system.

FIG. 4 illustrates, by way of example, one of these conventional systems, which has been constructed from a control unit 41, at least two sensors 42, a sensor wiring harness 43 and a vehicle wiring harness 44. The system includes, in addition, a loudspeaker 46 and a lamp 47 which are connected to the control unit 41 via a separate wiring harness 45. The separate wiring harness 45 may also be part of the sensor wiring harness 43 which establishes a line connection from the sensors 42 to the control unit 41. In addition, a mobile radio device 48 can be integrated, which is used as interface to the driver.

The linking of the sensors 42, of the loudspeaker 46 and of the indicator 47 is effected via cables. In order to image differing lengths and equipment variants (for example, as regards the number of sensors), use is made, as a rule, of unified sensors which are then with plugs to the (sensor) wiring harness 43, 45. This sensor wiring harness 43, 45 is manufactured with various lengths and coupling options, in order to employ the system flexibly.

However, this way of proceeding is disadvantageous, since many plug connections are required, which considerably increase the costs of this assistance system. The length of the wiring harness can also only be estimated in advance with difficulty, likewise resulting in additional costs. Accordingly, the sensors 42 have to be integrated on the rear part of the vehicle, whereas the loudspeaker 46 and the lamp 47 are may be integrated as closely as possible to the driver in a front part. The wiring harness 43, 45 therefore has to be laid from the front to the rear, for which purpose—for instance, in the case of a semitrailer—lengths of 15 m and more have to be spanned.

Moreover, in the conventional reversing system a dedicated control unit 41 is used which exhibits an appropriate interface for the wiring harness 43, 45 being utilized, and couples both to the braking system and to the lighting system, in order to undertake appropriate interventions. Finally, at least a dual linkage to the vehicle is required for these known systems, in which case separate connecting lines 44, 43, 45 are needed. The requisite plug connections and cables further increase the costs of these systems.

There is therefore a demand for alternative reversing-assistance systems that overcome at least some of the problems mentioned.

At least some of the problems mentioned are solved by a reversing-assistance system as described herein, by a utility vehicle as described herein, and by a method as described herein. The further descriptions herein define further advantageous embodiments.

SUMMARY OF THE INVENTION

The present invention relates to a reversing-assistance system (for example, a ramp-approach aid) for a vehicle, in particular for a utility vehicle that exhibits a vehicle wiring harness. The reversing-assistance system includes at least one sensor and a control unit. The at least one sensor exhibits a first wireless interface, in order to register a rear region of the vehicle and to transmit corresponding sensor signals in wireless manner. The control unit is connected to the vehicle wiring harness and exhibits a second wireless interface, in order to receive the sensor signals from the at least one sensor in wireless manner. The control unit is further configured to evaluate the sensor signals and to make results available (for example, via the vehicle wiring harness or the first wireless interface). In addition, the control unit is configured to evaluate vehicle-related data independently of the sensor signals and, on the basis of these data, to carry out a control of at least one component of the vehicle and in this way to perform a control function that is independent of the reversing assistance.

In contrast to the conventional systems, the control unit is consequently not a control unit dedicated to the assistance of reversing maneuvers but is a control unit in the vehicle that is already available for a different function. By a "vehicle", in particular a tractor or a trailer or any other utility vehicle may be understood. If several sensors are present, each of them may respectively exhibit a wireless interface. By a "wireless interface", in principle any interface is to be encompassed that is capable of carrying out a wireless transmission of data.

Optionally, the reversing-assistance system includes an acoustic and/or visual indicator with (respectively) a third wireless interface, the control unit being further configured to send at least some of the results of the evaluation to the acoustic and/or visual indicator in wireless manner. For example, the acoustic indicator comprises a loudspeaker, and the visual indicator comprises a display (for example, installed in the vehicle or on a mobile device).

Optionally, the control of the at least one component encompasses a braking intervention, and the control unit is configured to execute at least one of the following functions:
  to monitor, on the basis of the sensor signals, a reversing maneuver of the vehicle,
  to ascertain a distance from a rear obstacle by way of result,
  to warn the driver acoustically and/or visually when a critical driving situation obtains which, in particular, includes falling short of a threshold value for the distance from the obstacle or exceeding a maximum speed of approach to the obstacle,
  to trigger the braking intervention if, despite the warning given to the driver, no alleviation of the critical driving situation occurs or an immediate action is required (for example, in the case of a person or object suddenly appearing, so that a collision would be unavoidable without immediate action).

Optionally, the vehicle wiring harness couples to a fourth wireless interface, in order to transmit information to a mobile device or an indicator in wireless manner, and the control unit is optionally configured to communicate the results to the mobile device or the indicator via the vehicle wiring harness, utilizing the fourth wireless interface.

Optionally, at least one of the following units is configured to be supplied with power by a battery:
  the at least one sensor,
  the acoustic indicator,
  the visual indicator.

Optionally, the at least one sensor comprises one or more distance sensors, in particular an ultrasonic sensor or a radar sensor or a lidar.

Optionally, the wireless interfaces are based on the same standard or on differing standards, and the standards encompass, for instance, a Wi-Fi standard, a Bluetooth standard or a different wireless radio standard. Accordingly, the control unit with the sensors can utilize a different standard than when the results are being transmitted to the indicator. The standard being utilized may depend, for example, on the range that has to be spanned.

The present invention also relates to a utility vehicle with a vehicle wiring harness and, in particular, to a tractor or to a trailer that exhibit a reversing-assistance system previously described.

The present invention also relates to a method for assisting a reversing maneuver of a vehicle, in particular a utility vehicle, that exhibits a vehicle wiring harness, at least one sensor for registering a rear region, and a control unit. The method comprises the following steps:
  prompting the at least one sensor to register sensor signals for the rear region of the vehicle;
  prompting a wireless transmission of the sensor signals from the at least one sensor to the control unit;
  evaluating the sensor signals in the control unit; and
  providing results of the evaluation (for example, via the vehicle wiring harness or a wireless interface of the control unit).

In addition, the control unit is configured to evaluate vehicle-related data independently of the sensor signals and, on the basis of these data, to carry out a control of at least one component of the vehicle. In this way, the control unit performs a control function that is independent of the reversing assistance.

This method, or at least parts thereof, may also have been implemented or stored in the form of instructions in software or on a computer-program product, in which case stored instructions are capable of executing the steps according to the method when the method is running on a processor. Therefore the present invention also relates to a computer-program product with software code (software instructions) stored thereon which is configured to execute one of the methods previously described when the software code is executed by a processing unit. The processing unit may be any form of computer or control unit that exhibits an appropriate microprocessor that is able to execute a software code.

Exemplary embodiments of the present invention solve at least some of the aforementioned problems by utilizing wireless technology. For this purpose, the attachments (sensors, indicators, etc.) are enhanced by suitable radio interfaces (for example, Wi-Fi, Bluetooth, WLAN, etc.). An individual power supply (for example, via a battery) may also have been provided. Exemplary embodiments do not, in particular, need a dedicated control unit, and instead can utilize a control unit already present in the vehicle. At the present time, already installed telematic units (such as, for instance, the iTAP system or other telematic systems) which already possess the necessary computing power and the necessary radio interfaces, or which can be retrofitted with little effort, frequently exist in vehicles. Consequently, exemplary embodiments enable an inexpensive conversion through a re-use of already existing components. By virtue of the functional enhancements, no disproportionately high or increasing costs arise, that Since more and more systems will possess the basic requirements for this technology in the future, a particular advantage of exemplary embodiments consists in the fact that an easy and inexpensive retrofitting is possible.

The exemplary embodiments of the present invention will be better understood from the following detailed description and the accompanying drawings of the varying exemplary embodiments, which, however, should not be understood in such a way that they restrict the disclosure to the specific embodiments, but serve merely for elucidation and comprehension.

DETAILED DESCRIPTION

Figure 1:
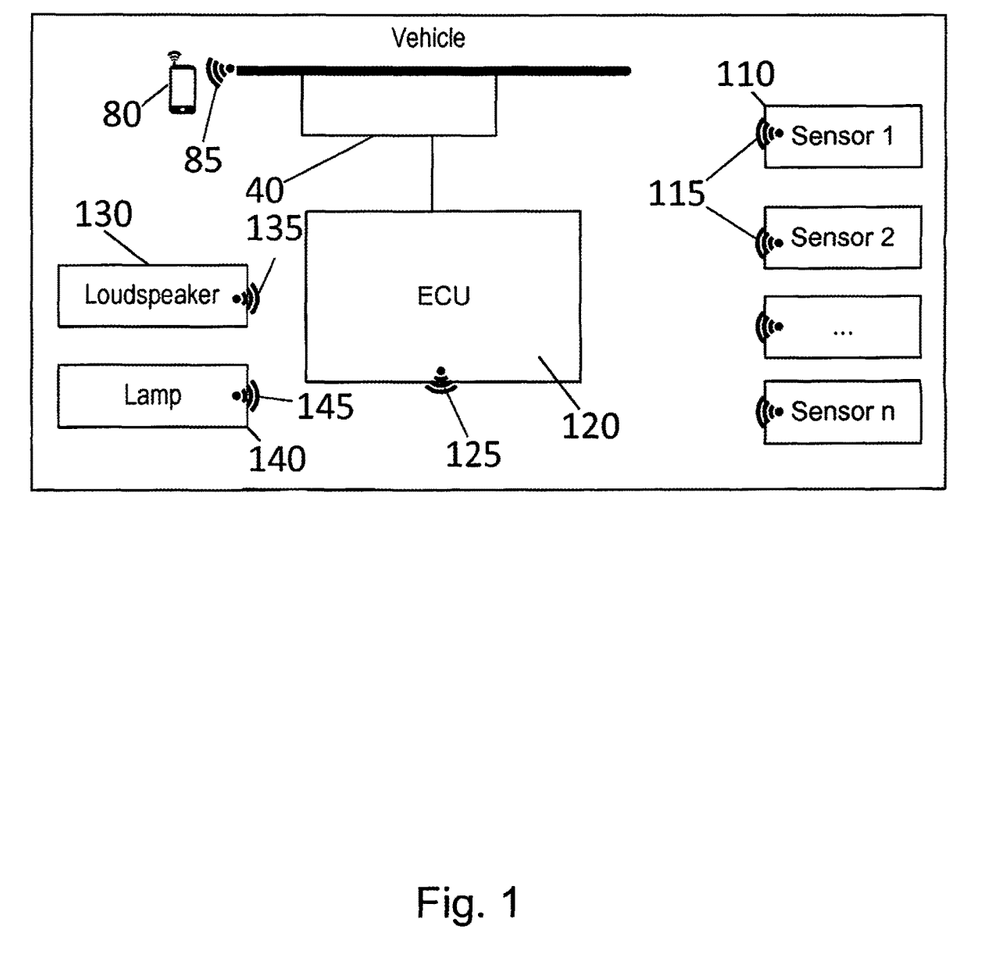
FIG. 1 shows a reversing-assistance system according to an exemplary embodiment of the present invention.

FIG. 1 shows a reversing-assistance system according to an exemplary embodiment of the present invention. The reversing-assistance system is suitable for a vehicle with a vehicle wiring harness 40 and, in particular, for a utility vehicle or a trailer of a utility vehicle. The reversing-assistance system includes at least one sensor 110 with a first wireless interface 115, in order to register a rear region of the vehicle and to transmit corresponding sensor signals in wireless manner. The reversing-assistance system further includes a control unit 120 which is connected to the vehicle wiring harness and exhibits a second wireless interface 125, in order to receive the sensor signals from the at least one sensor in wireless manner. The control unit is configured to evaluate the sensor signals and to make results of the evaluation available. The control unit 120 is a control unit (or a part thereof) that has been provided in the vehicle for at least one other control function. Accordingly, said control unit can evaluate vehicle-related data that are independent of the sensor signals and, on the basis of these data, can carry out a control of at least one component of the vehicle. The control unit 120 may be, for example, an electronic control unit (ECU) that controls or influences the braking of the vehicle (for example, it may be part of an ABS, EBS, EPB, etc.). Therefore the control of the component may, in particular, encompass a braking intervention, in order to decelerate or to stabilize the vehicle.

In principle, the number and type of sensors can be chosen freely. In FIG. 1, n sensors 110 are shown by way of example, which can be arranged at various positions, for example on a rear wall of a trailer. These sensors 110 may be, for example, ultrasonic sensors, radar sensors, infrared sensors, lidar sensors, etc., or may exhibit such sensors.

Optionally, the exemplary embodiment from FIG. 1 includes at least one loudspeaker 130 and a lamp 140, which also respectively exhibit a third wireless interface 135, 145, in order to exchange data and information with the control unit 120 in wireless manner.

The vehicle wiring harness 40 includes, by way of example, a fourth wireless interface 85 which is configured to establish a radio link to an indicator or a mobile device 80 (for example, a mobile radio device) via which the driver or another person can be warned in relation to a critical situation or alternatively is informed only about the progress of the reversing maneuver. The optional indicator 80 may also have been formed in a dashboard of the vehicle and may communicate a visual representation concerning the progress of the reversing maneuver to the driver.

For instance, the control unit is configured to execute at least one of the following functions:

- to ascertain (continuously) a distance from a rear obstacle by way of result,
- to monitor, on the basis of the sensor signals, a reversing maneuver of the vehicle (for example, to ascertain, on the basis of a continuous distance measurement, a speed of a reversing maneuver),
- to warn the driver acoustically and/or visually when a critical driving situation obtains which, in particular, includes falling short of a threshold value for a distance from an obstacle or exceeding a maximum speed of approach to the obstacle,
- to trigger a braking intervention if, despite the warning given to the driver, no alleviation of the critical driving situation occurs or a person or object suddenly appears and immediate action is required in order to avoid a collision.

Consequently, exemplary embodiments permit various possibilities in order to give a driver a feedback. These possibilities encompass, for example, a braking intervention, an acoustic feedback via the loudspeaker, a visual feedback via the lamp(s) or display(s) or via a cell phone. In a simple version, a small number of sensors can (continuously) measure the distance from a ramp. In more complex systems, several sensors can monitor a larger region of the rear space, so that potential damage can be reduced or prevented.

Figure 2:
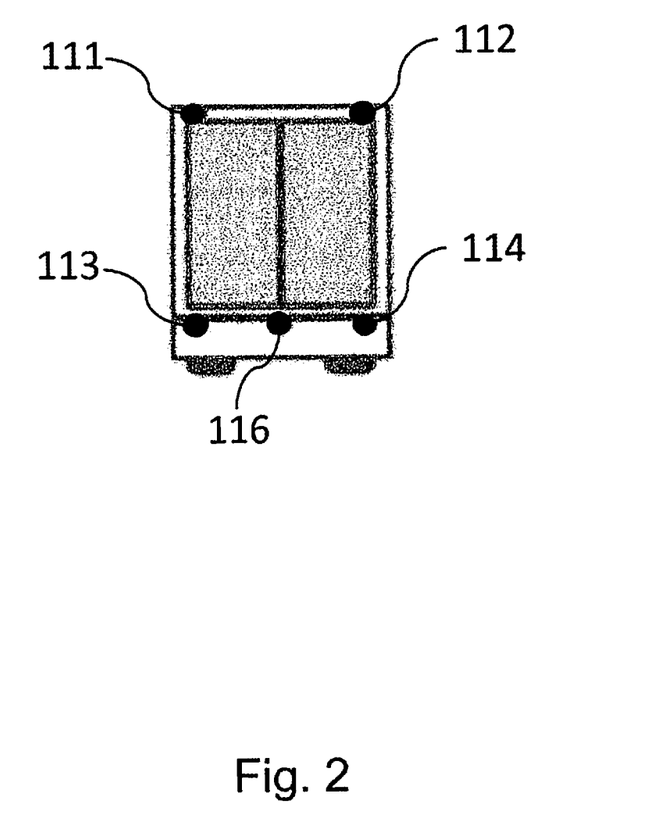
FIG. 2 illustrates, by way of example, possible arrangements of the sensors on a rear wall of a trailer.

FIG. 2 shows, by way of example, possible arrangements of the sensors 110 on a rear wall of a trailer. In the exemplary embodiment shown, a first sensor 111 is arranged at an upper left corner of the trailer (viewed from the rear), a second sensor 112 is arranged at a right upper corner of the trailer, a third sensor 113 is arranged at a lower left corner of the trailer, and a fourth sensor 114 is arranged at a lower right corner of the rear wall of the trailer. Optionally, a fifth sensor 116 has furthermore been arranged in a central position below the access to the loading area. In further exemplary embodiments, fewer or more or the positions of the sensors can be varied and adapted to the corresponding requirements.

Each of the sensors shown may exhibit, by way of example, its own wireless interface 115 (not visible in FIG. 2). Optionally, it is also possible that some of the sensors have been connected to one another by a wire connection, and communicate with the control unit 120 with a common wireless interface 115.

Figure 3:
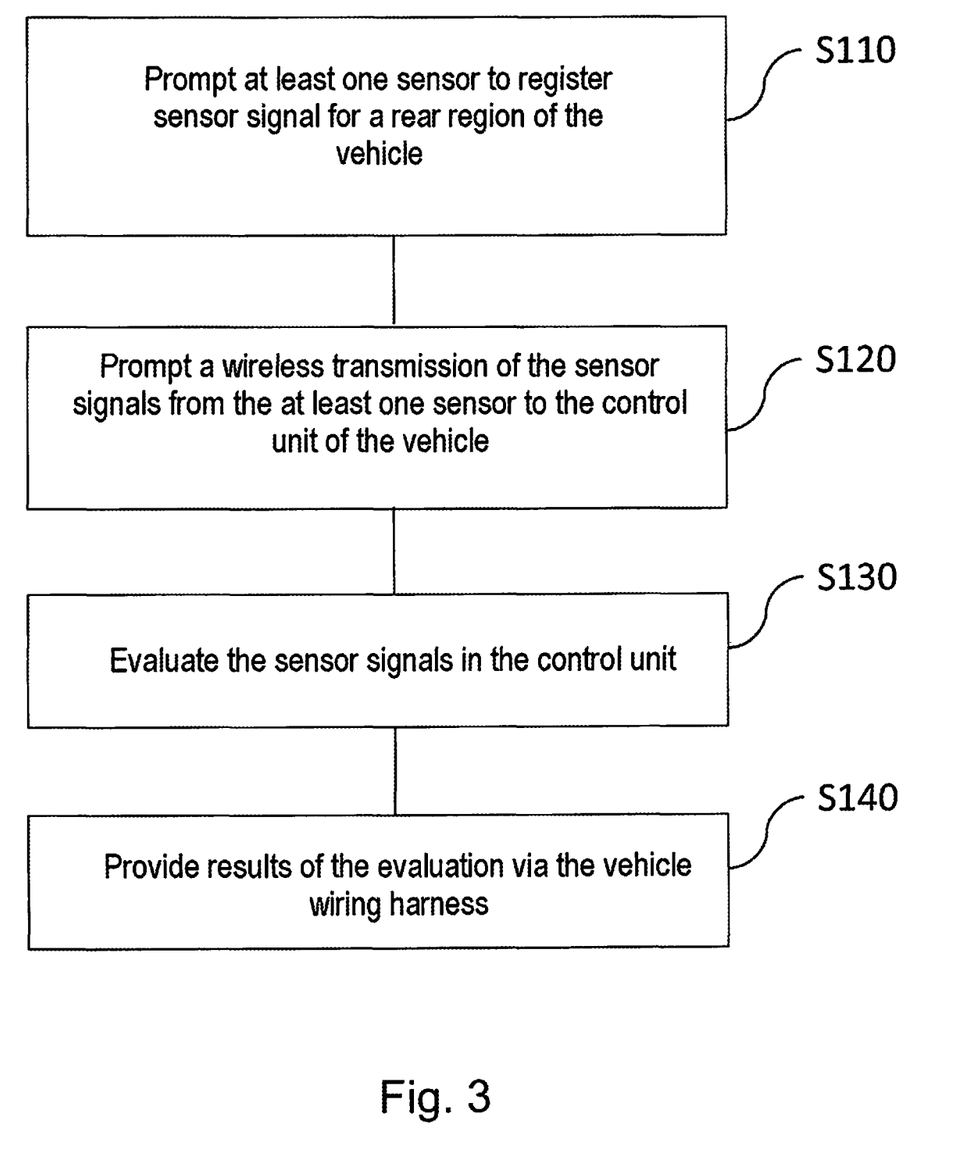
FIG. 3 shows a flowchart for a method for assisting a reversing maneuver of a vehicle, according to an exemplary embodiment.

FIG. 3 shows a flowchart for a method for assisting a reversing maneuver of a vehicle, according to an exemplary embodiment of the present invention. The process comprises the following steps:

- prompting S110 at least one sensor to register sensor signal for a rear region of the vehicle;
- prompting S120 a wireless transmission of the sensor signals from the at least one sensor to a control unit of the vehicle;
- evaluating S130 the sensor signals in the control unit; and
- providing S140 results of the evaluation via the vehicle wiring harness or via a wireless interface of the control unit.

The method is, in turn, executed in a control unit which in the vehicle also executes other functions (other than the reversing assistance). Accordingly, the control unit may be an arbitrary vehicle control unit or brake control unit—or may have been implemented therein via software—that evaluates vehicle-related data that are independent of the sensor signals, and, on the basis of these data, carries out a control of a component of the vehicle. The component may be, for example, a brake, and the control may relate to an anti-lock function or to a vehicle stabilization or trailer stabilization.

The method may also be computer-implemented—that is to say, it may have been realized by instructions that have been stored on a storage medium and are capable of executing the steps of the method when it is running on a processor. The instructions typically comprise one or more instructions that can be stored in varying ways on varying media in, or peripheral to, a control unit (with a processor), which, when they are read and executed by the control unit, prompt the control unit to execute functions, functionalities and operations that are necessary for executing a method according to the present invention.

The features of the invention disclosed in the description, in the claims and in the figures may be essential—both individually and in arbitrary combination—for the realization of the invention.

THE LIST OF REFERENCE SYMBOLS IS AS FOLLOWS 40, 45 wiring harness
42 wired sensors
43 sensor wiring harness
80, 48 indicator
110, 111, 112, . . . sensor(s)
85, 115, 125, wireless interfaces
120, 41 control unit
130, 46 loudspeaker
140, 47 lamp

The invention claimed is:

1. A reversing-assistance system for a utility vehicle with a trailer, which includes a vehicle wiring harness, comprising:

at least one sensor with a first wireless interface, to register a rear region of the vehicle and to transmit corresponding sensor signals of the rear region of the vehicle in a wireless manner; and a control unit, which is connected to the vehicle wiring harness and which includes a second wireless interface, to receive the sensor signals of the rear region of the vehicle from the at least one sensor in a wireless manner, to evaluate the sensor signals and to use the evaluated sensor signals to perform a braking intervention;

wherein the control unit is configured to evaluate vehicle-related data independently of the evaluated sensor signals and, based on the data, to carry out a control of at least one component of the vehicle so as to perform a control function that is independent of the reversing assistant, wherein the at least one sensor includes a plurality of sensors to register the rear region of the vehicle, wherein the control unit includes an electronic control unit (ECU) that controls and/or influences the braking of the vehicle via an anti-lock braking system (ABS), an electronic braking system (EBS), and/or an electric parking braking (EPB) to decelerate or stabilize the vehicle, wherein the control of the at least one component includes the braking intervention, and wherein the control unit is configured to perform the following:

monitoring, based on the sensor signals, a reversing maneuver of the vehicle, ascertaining a distance from a rear obstacle to the rear of the vehicle, warning acoustically and visually the driver when there is a critical driving situation, which includes falling short of a threshold value for the distance from the obstacle or exceeding a maximum speed of approach to the obstacle, and triggering the braking intervention if, despite the warning to the driver, no alleviation of the critical driving situation occurs or an immediate action is required, wherein the control unit is a vehicle control unit, or a part thereof, that is in the vehicle for at least one other control function, wherein the control unit can evaluate vehicle-related data that are independent of the evaluated sensor signals and, based on the vehicle-related data, can carry out a control of at least one component of the vehicle, and wherein the control unit includes an electronic control unit (ECU) that controls or influences the braking of the vehicle, including as at least a part of an anti-lock brake system (ABS), an electronic braking system (EBS), or electric parking brake (EPB), so that control of the component can encompass a braking intervention, so as to decelerate or to stabilize the vehicle, wherein at least one of the following units is configured to be supplied with power by a battery: the at least one sensor, the acoustic indicator, and/or the visual indicator, and wherein the at least one sensor includes one or more distance sensors, and wherein a first sensor and/or a second sensor are arranged at an upper left corner and/or at a right upper corner of the trailer, a third sensor and/or a fourth sensor are arranged at a lower left corner and/or at a lower right corner of the rear wall of the trailer, wherein each of the sensors have their own wireless interface, and wherein the sensors are connected to one another by a wired connection and communicate with the control unit with a common wireless interface.

2. The reversing-assistance system of claim 1, further comprising:

an acoustic and/or visual indicator having a third wireless interface, wherein the control unit is further configured to send wirelessly at least some of the results of the evaluation to the acoustic and/or visual indicator.

3. The reversing-assistance system of claim 1, wherein the vehicle wiring harness couples to a fourth wireless interface to transmit information to a mobile device or an indicator, and wherein the control unit is configured to communicate the results to the mobile device or the indicator via the vehicle wiring harness, using the fourth wireless interface.

4. The reversing-assistance system of claim 1, wherein the wireless interfaces are based on the same or on differing standards, and the standards include a Wi-Fi standard, a Bluetooth standard and/or a different wireless standard.

5. A utility vehicle, including a tractor and a trailer, with a vehicle wiring harness, comprising:

a reversing-assistance system, including:

at least one sensor with a first wireless interface, to register a rear region of the vehicle and to transmit corresponding sensor signals of the rear region of the vehicle in a wireless manner; and a control unit, which is connected to the vehicle wiring harness and which includes a second wireless interface, to receive the sensor signals of the rear region of the vehicle from the at least one sensor in a wireless manner, to evaluate the sensor signals and to use the evaluated sensor signals to perform a braking intervention;

wherein the control unit is configured to evaluate vehicle-related data independently of the evaluated sensor signals and, based on the data, to carry out a control of at least one component of the vehicle so as to perform a control function that is independent of the reversing assistant, wherein the at least one sensor includes a plurality of sensors to register the rear region of the vehicle, wherein the control unit includes an electronic control unit (ECU) that controls and/or influences the braking of the vehicle via an anti-lock braking system (ABS), an electronic braking system (EBS), and/or an electric parking braking (EPB) to decelerate or stabilize the vehicle, and wherein the control of the at least one component includes the braking intervention, and wherein the control unit is configured to perform the following:

monitoring, based on the sensor signals, a reversing maneuver of the vehicle, ascertaining a distance from a rear obstacle to the rear of the vehicle, warning acoustically and visually the driver when there is a critical driving situation, which includes falling short of a threshold value for the distance from the obstacle or exceeding a maximum speed of approach to the obstacle, and triggering the braking intervention if, despite the warning to the driver, no alleviation of the critical driving situation occurs or an immediate action is required, wherein the control unit is a vehicle control unit, or a part thereof, that has been provided in the vehicle for at least one other control function, wherein the control unit can evaluate vehicle-related data that are independent of the evaluated sensor signals and, based on the vehicle-related data, can carry out a control of at least one component of the vehicle, and wherein the control unit includes an electronic control unit (ECU) that controls or influences the braking of the vehicle, including as at least a part of an anti-lock brake system (ABS), an electronic braking system (EBS), or electric parking brake (EPB), so that control of the component can encompass a braking intervention, so as to decelerate or to stabilize the vehicle, wherein at least one of the following units is configured to be supplied with power by a battery: the at least one sensor, the acoustic indicator, and/or the visual indicator, and wherein the at least one sensor includes one or more distance sensors, and wherein a first sensor and/or a second sensor are arranged at an upper left corner and/or at a right upper corner of the trailer, a third sensor and/or a fourth sensor are arranged at a lower left corner and/or at a lower right corner of the rear wall of the trailer, wherein each of the sensors have their own wireless interface, and wherein the sensors are connected to one another by a wired connection and communicate with the control unit with a common wireless interface.

6. A method for assisting a reversing maneuver of a utility vehicle with a trailer, having a vehicle wiring harness, at least one sensor for registering a rear region, and a control unit, the method comprising:
prompting the at least one sensor to register sensor signals for the rear region of the vehicle;
prompting a wireless transmission of the sensor signals of the rear region of the vehicle from the at least one sensor to the control unit;
evaluating the sensor signals of the rear region of the vehicle in the control unit; and
providing results of the evaluated sensor signals;
wherein the control unit is configured to evaluate vehicle-related data independently of the evaluated sensor signals of the rear region of the vehicle and, based on the data, to carry out a control of at least one component of the vehicle, so as to perform a control function that is independent of the reversing assistant,
wherein the at least one sensor includes a plurality of sensors to register the rear region of the vehicle,
wherein the control unit includes an electronic control unit (ECU) that controls and/or influences the braking of the vehicle via an anti-lock braking system (ABS), an electronic braking system (EBS), and/or an electric parking braking (EPB) to decelerate or stabilize the vehicle, and
wherein the control of the at least one component includes the braking intervention, and wherein the control unit is configured to perform the following:
monitoring, based on the sensor signals, a reversing maneuver of the vehicle,
ascertaining a distance from a rear obstacle to the rear of the vehicle,
warning acoustically and visually the driver when there is a critical driving situation, which includes falling short of a threshold value for the distance from the obstacle or exceeding a maximum speed of approach to the obstacle, and
triggering the braking intervention if, despite the warning to the driver, no alleviation of the critical driving situation occurs or an immediate action is required,
wherein the control unit is a vehicle control unit, or a part thereof, that has been provided in the vehicle for at least one other control function,
wherein the control unit can evaluate vehicle-related data that are independent of the evaluated sensor signals and, based on the vehicle-related data, can carry out a control of at least one component of the vehicle, and wherein the control unit includes an electronic control unit (ECU) that controls or influences the braking of the vehicle, including as at least a part of an anti-lock brake system (ABS), an electronic braking system (EBS), or electric parking brake (EPB), so that control of the component can encompass a braking intervention, so as to decelerate or to stabilize the vehicle,
wherein at least one of the following units is configured to be supplied with power by a battery: the at least one sensor, the acoustic indicator, and/or the visual indicator, and wherein the at least one sensor includes one or more distance sensors, and
wherein a first sensor and/or a second sensor are arranged at an upper left corner and/or at a right upper corner of the trailer, a third sensor and/or a fourth sensor are arranged at a lower left corner and/or at a lower right corner of the rear wall of the trailer, wherein each of the sensors have their own wireless interface, and wherein the sensors are connected to one another by a wired connection and communicate with the control unit with a common wireless interface.

7. A non-transitory computer readable medium having a computer-program, which is executable by a processor, comprising:
a program code arrangement having program code for assisting a reversing maneuver of a utility vehicle with a trailer, having a vehicle wiring harness, at least one sensor for registering a rear region, and a control unit, by performing the following:
prompting the at least one sensor to register sensor signals for the rear region of the vehicle;
prompting a wireless transmission of the sensor signals of the rear region of the vehicle from the at least one sensor to the control unit;
evaluating the sensor signals in the control unit; and
providing results of the evaluated sensor signals;
wherein the control unit is configured to evaluate vehicle-related data independently of the evaluated sensor signals and, based on the data, to carry out a control of at least one component of the vehicle, so as to perform a control function that is independent of the reversing assistant,
wherein the at least one sensor includes a plurality of sensors to register the rear region of the vehicle,
wherein the control unit includes an electronic control unit (ECU) that controls and/or influences the braking of the vehicle via an anti-lock braking system (ABS), an electronic braking system (EBS), and/or an electric parking braking (EPB) to decelerate or stabilize the vehicle, and
wherein the control of the at least one component includes the braking intervention, and wherein the control unit is configured to perform the following:
monitoring, based on the sensor signals, a reversing maneuver of the vehicle,
ascertaining a distance from a rear obstacle to the rear of the vehicle,
warning acoustically and visually the driver when there is a critical driving situation, which includes falling short of a threshold value for the distance from the obstacle or exceeding a maximum speed of approach to the obstacle, and
triggering the braking intervention if, despite the warning to the driver, no alleviation of the critical driving situation occurs or an immediate action is required,
wherein the control unit is a vehicle control unit, or a part thereof, that has been provided in the vehicle for at least one other control function,
wherein the control unit can evaluate vehicle-related data that are independent of the evaluated sensor signals and, based on the vehicle-related data, can carry out a control of at least one component of the vehicle, and wherein the control unit includes an electronic control unit (ECU) that controls or influences the braking of the vehicle, including as at least a part of an anti-lock brake system (ABS), an electronic braking system (EBS), or electric parking brake (EPB), so that control of the component can encompass a braking intervention, so as to decelerate or to stabilize the vehicle,
wherein at least one of the following units is configured to be supplied with power by a battery: the at least one sensor, the acoustic indicator, and/or the visual indicator, and wherein the at least one sensor includes one or more distance sensors, and wherein a first sensor and/or a second sensor are arranged at an upper left corner and/or at a right upper corner of the trailer, a third sensor and/or a fourth sensor are arranged at a lower left corner and/or at a lower right corner of the rear wall of the trailer, wherein each of the sensors have their own wireless interface, and wherein the sensors are connected to one another by a wired connection and communicate with the control unit with a common wireless interface.

8. The reversing-assistance system of claim 1, wherein the at least one sensor includes one or more distance sensors, in particular an ultrasonic sensor or a radar sensor.

\* \* \* \* \*